United States Patent
Greetham

(10) Patent No.: US 9,087,207 B2
(45) Date of Patent: Jul. 21, 2015

(54) OBTAINING COMPLETE FORENSIC IMAGES OF ELECTRONIC STORAGE MEDIA

(75) Inventor: David A. Greetham, Houston, TX (US)

(73) Assignee: Ricoh Company, Ltd., Tokyo (JP)

(*) Notice: Subject to any disclaimer, the term of this patent is extended or adjusted under 35 U.S.C. 154(b) by 1131 days.

(21) Appl. No.: 12/726,553

(22) Filed: Mar. 18, 2010

(65) Prior Publication Data

US 2010/0241977 A1 Sep. 23, 2010

Related U.S. Application Data

(60) Provisional application No. 61/161,847, filed on Mar. 20, 2009.

(51) Int. Cl.

| | |
|---|---|
| *G06Q 99/00* | (2006.01) |
| *G06F 21/62* | (2013.01) |
| *G06F 21/78* | (2013.01) |
| *G06Q 50/18* | (2012.01) |
| *G06Q 50/00* | (2012.01) |
| *G06F 3/06* | (2006.01) |

(52) U.S. Cl.
CPC .......... *G06F 21/62* (2013.01); *G06F 21/78* (2013.01); *G06F 3/065* (2013.01); *G06F 3/0623* (2013.01); *G06F 3/0673* (2013.01); *G06Q 50/00* (2013.01); *G06Q 50/18* (2013.01); *G06Q 50/184* (2013.01)

(58) Field of Classification Search
CPC ...... G06Q 50/00; G06Q 50/18; G06Q 50/184
USPC ............... 705/50; 715/764; 707/639; 726/26
See application file for complete search history.

(56) References Cited

U.S. PATENT DOCUMENTS

| | | | |
|---|---|---|---|
| 7,640,323 B2 | 12/2009 | Sun | |
| 7,644,138 B2 | 1/2010 | Sun | |
| 7,716,196 B2* | 5/2010 | Ghielmetti et al. | 707/705 |
| 7,779,032 B1* | 8/2010 | Garfinkel | 707/776 |
| 7,809,130 B1* | 10/2010 | Kalyadin et al. | 380/1 |
| 8,014,976 B2* | 9/2011 | Carpenter et al. | 702/186 |
| 8,230,228 B2* | 7/2012 | Hahn et al. | 713/179 |
| 8,417,776 B2* | 4/2013 | Womack et al. | 709/204 |
| 2008/0033904 A1* | 2/2008 | Ghielmetti et al. | 707/1 |
| 2008/0065811 A1* | 3/2008 | Jahangiri | 711/100 |
| 2009/0094045 A1 | 4/2009 | Perlin | |
| 2009/0094203 A1 | 4/2009 | Kim | |
| 2009/0164522 A1* | 6/2009 | Fahey | 707/104.1 |
| 2009/0247122 A1 | 10/2009 | Fitzgerald | |
| 2009/0253410 A1 | 10/2009 | Fitzgerald | |
| 2009/0287910 A1* | 11/2009 | Wilson | 712/220 |
| 2010/0299740 A1* | 11/2010 | Sheldon et al. | 726/12 |

* cited by examiner

*Primary Examiner* — James D Nigh
(74) *Attorney, Agent, or Firm* — Hickman Palermo Becker Bingham LLP; Edward A. Becker

(57) ABSTRACT

In a method of obtaining a complete forensic image of an electronic storage media containing electronic data, the storage media is part of a computer system. The method includes the steps of: (a) storing a data collection program on an external storage device; (b) sending the external storage device to a custodian of the electronic data, together with means for the custodian to easily return the external storage device; (c) requiring the custodian to connect the external storage device to a computer system containing the storage media; (d) requiring the custodian to use the data collection program to forensically collect the electronic data to create a complete forensic image of the storage media containing the electronic data; (e) authenticating the forensic image; and (f) preserving an exact copy of the forensic image without making changes to the forensic image.

14 Claims, 1 Drawing Sheet

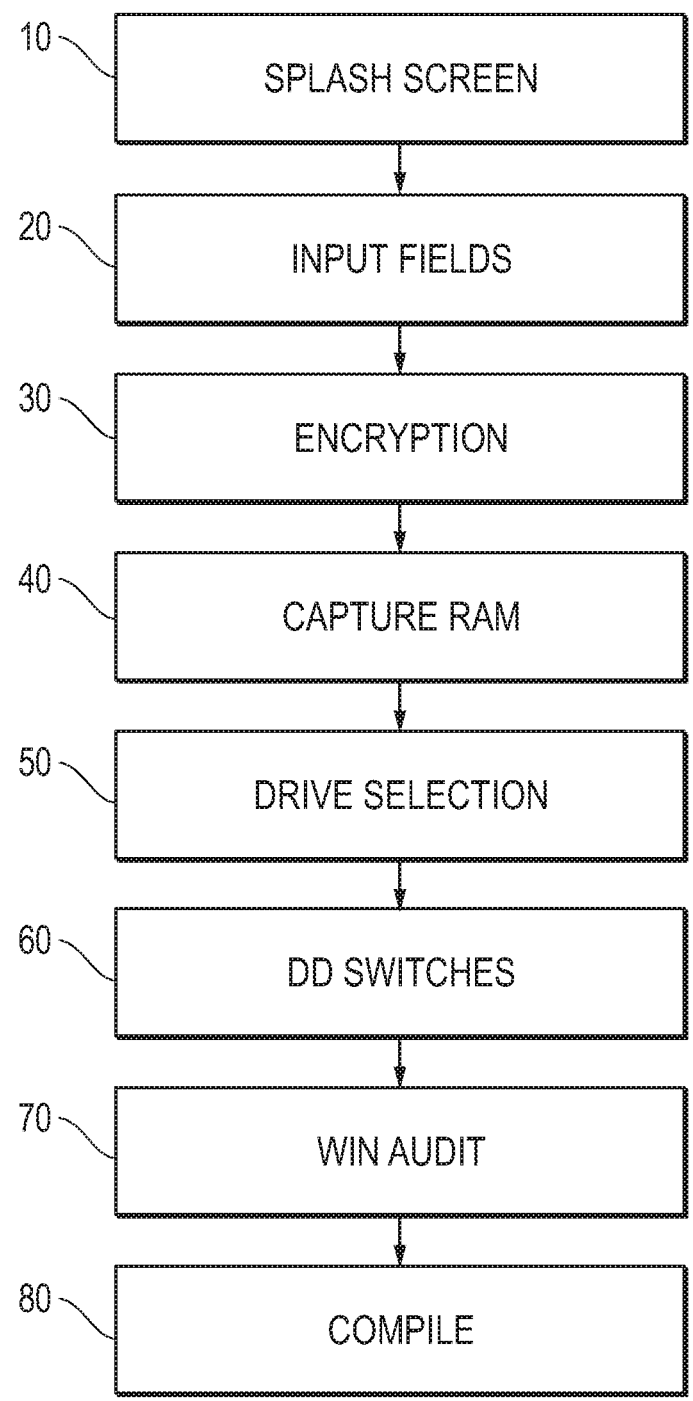

OBTAINING COMPLETE FORENSIC IMAGES OF ELECTRONIC STORAGE MEDIA

CROSS-REFERENCES TO RELATED APPLICATIONS

This patent application claims the benefit of provisional patent application Ser. No. 61/161,847, filed Mar. 20, 2009.

STATEMENT REGARDING FEDERALLY SPONSORED RESEARCH OR DEVELOPMENT

None.

REFERENCE TO A "SEQUENCE LISTING," A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC

None.

BACKGROUND OF THE INVENTION (1) Field of the Invention

The invention relates to methods for collecting data for use as evidence in civil or criminal investigations.

(2) Description of the Related Art

Traditionally, in civil and criminal investigations, electronically stored information ("ESI") has been collected in one of the following methods: making the usual file copy (which most computer users know how to do), making a special backup, and forensic imaging.

The usual file copy is the most straight forward process, and simply involves selecting the files or folders on an storage device (typically a computer's hard drive) and copying them to another piece of electronic media (typically an external hard drive, USB flash drive or CD/DVD). Quite often, this process is performed by the custodian of the Electronically Stored Information (ESI) themselves, or a company's IT professional. The commonly perceived advantages of this collection method are that it has few logistical requirements, and can be performed by someone with limited technical knowledge. Software tools such as Microsoft's ROBOCOPY can automate the copy process, but the complexity and learning curve of those tools typically negate the advantage of the simplicity of the file copy process. Another disadvantage is that the file copy method will only collect "live" files; files that are clearly viewable and accessible by the custodian on the computer system. Another disadvantage is that the file copy method can change information (metadata) about the files being copied, or even the data in the files. Such information may be of relevance to the matter, or could serve to establish foundation or authenticity of the files. An example of this would be a file's creation date and time, or the specific location of the file on a hard drive.

Additionally, the method of collecting ESI by merely making file copies does not include the ability to collect deleted files, and usually does not include system files and log files or unallocated disk space. Unallocated disk space is the area of the hard drive or electronic storage medium where previously viewable files are stored for a period of time. When a file is deleted using normal Microsoft Windows procedures, the operating system's reference to the deleted file is merely lost, making the deleted file no longer accessible, without the deployment of specialized tools, which can often recover the previously deleted file. Deleted files may show former possession of information, or attempts to destroy or alter evidence. System files and logs are often used to establish user activity, such as internet browsing, or movement of data to external media.

Most custodians of information relevant to an investigation or legal proceeding do not have the technical knowledge to locate system files and logs, and some files are not accessible by the custodian. The computer operating system, and most applications, cannot directly access deleted files or unallocated disk space.

Because the file-copy method of data collection is limited to only the files selected by the custodian, this method is not suitable if changes are made in the scope, after the original collection is completed. It is not uncommon for the scope of legal discovery or an investigation to change as new information is revealed throughout the course of the matter. Common scope changes include new key players being revealed, changes in relevant data types selected to be reviewed or changes to actual search criteria.

Using the usual file-copy data collection method, changes in scope after the initial collection require a second collection, and maybe a third collection and so on, as scope is refined. Additional collections not only result in additional time and cost, but also potential evidence can be lost or become inaccessible, if a court rules that additional collections are overly intrusive or burdensome to the custodian. Furthermore, even if additional collections are allowed, data may have also been altered or destroyed since the initial collection by normal computer functions, accidental alteration, or intentional destruction.

Putting the selection and collection process in the hands of the custodian greatly increases the possibility of accidental, negligent, or willful destruction, alteration, or omission of evidence. If such events occur, potentially relevant evidence can be lost, and responsible parties and their attorneys can face sanctions and or fines.

The second common method of data collection is to make a special backup. This method uses backup applications either included as part of the computer's operating system, such as Microsoft Windows Backup and Recovery, or after-market backup utilities such as Norton Ghost or Acronis TrueImage.

The special backup method requires more technical ability than the file-copy method, and appropriate backup software may not be preinstalled on the computer. Installing software on the computer could potentially alter the very evidence that is being collected. Other disadvantages are that backup software does not copy recoverable deleted files or unallocated disk space, and some backup software is known to alter certain metadata.

The third common option for collecting ESI is making a complete forensic image of a computer hard drive or other storage device. A complete forensic image is a verifiable bit-by-bit copy of the data stored on an electronic storage device, including deleted or unallocated data. This process bypasses the computer operating system, and in a non volatile manner, copies all of the data including recoverable deleted files, unused disk space, and system files. This method even copies areas of the physical storage device that are reserved for manufacturer access only, and areas that are empty and have never stored data (truly unused disk space). A complete forensic image is created using specialized software and/or hardware that copies all data on a hard drive in a verifiable and repeatable manner that does not alter the original media. A full forensic image collected by an experienced forensic professional is the industry standard method of collecting electronically stored information for use in civil and criminal matters, and has been for several years. Because a forensic image collects a complete copy of all data on a piece of electronic media, even if the scope of the matter changes, the data has already been collected and preserved in a read only format, and thus can be analyzed and produced by the custodian to the opposing party as needed.

Forensic imaging requires specialized knowledge, training, and tools. This combination of training and tools adds to the cost of data collection. Traditional forensic imaging also requires that a forensic expert have physical access to the electronic storage device. This can be a logistical nightmare, especially when dealing with large-scale collections or geographically dispersed custodians. With the development of telecommuting, this is more common than ever before. It is also difficult to collect data from busy executives and sales people due to their busy schedules. Unfortunately, these people are the ones most likely to be important custodians in litigation and investigations.

Because of the logistical and financial drawbacks of forensic imaging, particularly in large scale collections or in geographic regions where forensic professionals are not readily available, some organizations have previously chosen to not collect data using forensic imaging, thus risking court-ordered sanctions for spoliation of evidence.

The following U.S. patent applications disclose various inventions relating to a method of collecting complete computer forensic images of storage media: U.S. patent application no. 20090094203 discloses an apparatus and method for searching for digital forensic data. U.S. patent application no. 20090253410 discloses a method for mitigating the unauthorized use of a device. U.S. patent application no. 20090247122 discloses a system for monitoring the unauthorized use of a device. U.S. patent application no. 20090164522 discloses a method for the forensic collection of volatile and static data from active target computer systems. Each one of these patent applications is incorporated by reference in its entirety.

U.S. patent application no. 20090164522 states, "In preferred embodiments of the method, the data is collected covertly", and also "The active target computer in the above method can be a public computer in a library, hotel, internet cafe, school, and the like, or may be a personal computer left running unattended in a home or business and the like. The target computer can be any computer that has recently been used by a subject under investigation, preferably a computer in which the subject has not shutdown or restarted the system after use."

Unfortunately, the invention of U.S. patent application no. 20090164522 requires that "a user such as an agent's handler will preferably first be trained in the use of the system to fully understand its power and use." That method of data collection also requires that the trained user must select key information, including a label for the removable storage device to be used, case name, and user information, whether the system should generate code for covert or overt data collection, and the data items to be collected. Furthermore, U.S. patent application no. 20090164522 states about its "Data Acquisition Phase" the following: "This phase, while simplistic in use, can be the most complicated to perform."

U.S. Pat. Nos. 7,640,323 and 7,644,138 disclose a forensics tool for examination and recovery of computer data. Each one of these patents is incorporated by reference in its entirety. The invention of U.S. Pat. Nos. 7,640,323 and 7,644,138 allows a user to conduct a limited preliminary examination of a computer using a client program on a physical memory device, whereby limited information about the examination result is displayed. To further access and examine the actual underlying data, the user must obtain additional functionality by obtaining a command block from a control server. The additional functionality allows the client program to extract, copy, export, or further access the data of interest. Although the client program allows a user to repeatedly determine whether various drives contain information of interest, each time a determination is made, however, the user must contact the vendor and purchase additional features or commands. Specifically, a person investigating a target computer using forensic client software must visit the control server to purchase a command block and specifically tailor the exact type of data that is to be retrieved and downloaded onto an external drive. Once the customizable feature or command is purchased, it is usable with the client program only on a specific computer. Furthermore, the feature or command is specific to a specific hardware in a specific state.

Thus, what is needed is a method of data collection that does not require the custodian of the data to choose between (a) the evidentiary advantages and flexibility of making a forensic image, and (b) the simplicity and low cost of making a file copy. More specifically, what is needed is a method of collecting complete computer forensic images of storage media that allows the custodians to easily perform a self collection of all of the available storage space on their hard drives or other attached electronic media capable of storing data, while authenticating the collection, preserving exact copies of all live and unallocated data, without making changes to the collected data, and without allowing the custodian to deselect certain files, or accidently delete or spoil data.

BRIEF SUMMARY OF THE INVENTION

A method of obtaining a complete forensic image of an electronic storage media containing electronic data, the storage media being part of a computer system. The method comprises the steps of: (a) storing a data collection program on an external storage device; (b) sending the external storage device to a custodian of the electronic data, together with means for the custodian to easily return the external storage device; (c) requiring the custodian to connect the external storage device to a computer system containing the storage media; (d) requiring the custodian to use the data collection program to forensically collect the electronic data to create a complete forensic image of the storage media containing the electronic data; (e) authenticating the forensic image; and (f) preserving an exact copy of the forensic image without making changes to the forensic image.

In an alternate embodiment of the method of the present invention, after the custodian connects the external storage device to a computer system containing the data, the data collection program first asks the custodian to enter his name and email address. In another alternate embodiment of the method of the present invention, after the data collection program asks the custodian to enter his name and email address, the data collection program then asks the custodian to select which hard drive to image.

BRIEF DESCRIPTION OF THE SEVERAL VIEWS OF THE DRAWINGS

FIG. 1 is a flow chart showing the sub-parts of one of the steps of the method of the present invention.

DETAILED DESCRIPTION OF THE INVENTION

In the method of the present invention, in the first step a computer forensics company, such as Hill, Schwartz, Spilker Keller LLC in Houston, Tex., tailors the future collection of forensic images to a client's needs by storing a data collection program on a password-encrypted external storage device. In the preferred embodiment, the password-encrypted hard drive is the Aegis Padlock, manufactured by Apricorn, located in Poway, Calif. In the preferred embodiment, the password-encrypted hard drive has the following specifications:

a. 128-bit AES hardware encryption (256-bit available if required)
b. Interface—USB 2.0
c. Transfer rate up to 480 mbps
d. Power—100% Bus Powered
e. Buffersize: 8 MB
f. RPM—5400
g. Average seek time—12 ms
h. Average seek time—12 ms
i. Shock—operating 300 G 2 ms—Non operating 1000 G 1 ms
j. Dimensions & weight—19 mm×84.5 mm×120 mm—Weight 6.2 oz
k. Approvals from the FCC & CE ("CE" refers to certification from Europe)

Referring now to FIG. 1, a flow chart shows the parts of the first step of the method of the present invention, in which a computer forensics company, such as Hill, Schwartz, Spilker Keller LLC in Houston, Tex., tailors the future collection of forensic images to a client's needs by storing a data collection program on a password-encrypted external storage device. In step 10, the data collection program creates a splash screen for viewing by the forensic experts, using Irfanview, which is a graphics viewer by Irfanview Software, useable with Windows 9x, ME, NT, 2000, XP, 2003, 2008, Vista, and Windows 7. Irfanview allows the creation of custom images.

In step 20, the data collection program in default mode asks the custodian for first name, last name and e-mail address. However, a forensics expert may specify what information is required at the user input screen at the time of compiling the data collection program on the external storage device. The graphics for the input fields are also customizable, again facilitated by Irfanview software.

In step 30, the data collection program, if encryption has been enabled, prompts the forensics expert to select the level of encryption, and select the encryption token (using DD). DD is a commercial software tool created by GMG Systems, Inc.

In step 40, the data collection program prompts the forensics expert to select switches to capture RAM. If selected, the forensics expert will use the switches in the DD Module (created by GMG Systems, Inc.).

In step 50, the data collection program allows the forensic expert to select a drive to be imaged, using diskpart from Microsoft Windows Operating System to gather information about attached drives. The forensics expert decides whether the custodian will be allowed to select which drive to image, or if the default physical drive will be automatically acquired.

In step 60, the data collection program allows the forensic expert to select which DD switches will be used during the process of capturing the forensic data. Switch options include verification, chunked file sizes and logging options and verification.

In step 70, the data collection program allows the forensic expert to select the WIN audit switches to be used to perform a system audit after termination of the imaging by the DD program. Options include Operating System Version, logged on user name, hard drive size, and electronic serial numbers. WIN audit is a commercial software tool created by Parmavex Services, which audits Microsoft Windows based computers. Almost every aspect of computer inventory is available to be examined. In the preferred embodiment, the report is saved as a file.

In step 80, the data collection program is set to compile once all options are selected.

In the second step of the method of the present invention, the computer forensics company overnights by FedEx or UPS (or other suitable transit method) the password-encrypted hard drive to a custodian of data to be collected, and separately provides the custodian with the password. The computer forensics company also includes a prepaid return box for returning by overnight delivery the password-encrypted hard drive.

In the third step of the method of the present invention, the custodian of the data to be collected plugs the password-encrypted hard drive into an available USB port of the computer system containing the data or device to be collected. Once the computer system recognizes that an external device has been connected, the custodian enters the password previously provided to access the hard drive In the fourth step of the method of the present invention, the data collection program forensically collects the data on the custodian's hard drive. In an optional embodiment, the data collection program first asks the custodian to input his name and email address. This information is recorded and used to create the naming convention for the forensic image(s) that are subsequently created. In another optional embodiment, the data collection program asks the custodian to select which hard drive or storage device to image.

The data collection program creates a sector by sector (or bit-by-bit) complete computer forensic image of the targeted computer hard drive or storage device from within the operating system. The forensic image is written to the external hard drive, which has already been encrypted, and therefore the image itself is not encrypted, but could be encrypted, using AES 256 bit encryption. The data collection program creates the forensic image by calling DD.exe (software produced by, and made freely available via the Internet by, GMG Systems, Inc.), or any other suitable forensic acquisition program, which creates a complete forensic image of the hard drive or storage device. At completion, the DD program verifies that it has imaged the hard drive, at which time it terminates. During the process, the custodian could use the computer to execute other applications, but such use risks causing (a) an abnormal termination of the data collection program and (b) changes to the data being collected. DD.exe is a DOS based application. While DD is running, the Windows API is not running any other software if no other applications are executed by the custodian. The created forensic image has the following characteristics:

a. DD RAW image (E01 compatible) format
b. Optionally chunked to 2 GB files
c. Optional MD5 verification (The MD5 hash algorithm is used to verify image integrity.)

The DD forensic data acquisition program includes the following available switches:

Usage: dd if=[SOURCE] of=[DESTINATION] [OPTIONS]

Copy a device according to the options specified:

| | |
|---|---|
| bs=[BYTES] | Set 'ibs' and 'obs' equal to BYTES. | conv=[KEYWORDS] Convert the input as per the comma separated keyword list. The following are valid keywords:

| | |
|---|---|
| noerror - | Continue reading after errors. |
| comp - | Compress the output. |
| decomp - | Decompress the output. |
| swab - | Swap each pair of bytes. |
| notrunc - | Don't truncate the output file. |
| resume - | Resume a broken copy operation (Enterprise level only). |
| count=[BLOCKS] | Copy only the specified number of input blocks. |
| ibs=[BYTES] | Sets the input block size. |
| if=[SOURCE] | Specifies the source for input; the default is stdin. |
| obs=[BYTES] | Sets the output block size. |
| of=[DESTINATION] | Specifies the destination for output; the default is stdout. |
| seek=[BLOCKS] | Skip the specified number of obs-sized blocks at start of output. |
| skip=[BLOCKS] | Skip the specified number of ibs-sized blocks at start of input. |
| --iport {PORT} | Send output to the specified tcpip PORT. |
| --lport {PORT} | Send log output to the specified tcpip PORT. |
| --tport {PORT} | Send cryptographic thumbprint output to the specified tcpip PORT. |

If --iport or --lport or --tport are specified, the OUTPUT_FILE specified with the 'of' option will be interpreted as an IP address.

| | |
|---|---|
| -g --gather | Append multiple input files to a single output file. |
| -a --append | Append input to the output file. |
| -r --recursive | Recursively search subdirectories for files to copy. Valid only if 'if' specifies a search pattern. |
| --help | Display this help and exit. |
| -v --verbose | Output verbose information. |
| --cryptsum [ALGORITHM] | Includes one or more cryptographic checksums in the output. "md2", "md4", "md5" and "sha" or "sha1" are supported on all platforms "sha_256", "sha_384" and "sha_512" are supported on Windows Server 2003 and later. |
| --cryptout [FILE] | Write cryptographic checksum to the specified file. |
| --verify | Verifies the cryptographic checksum of the output file. |
| --verify_original | Verifies whether the input has changed while being copied. |
| --sparse | Makes the output file sparse (ntfs only). |
| --log [FILE] | Write log output to FILE. |
| --lockin | Lock input file while copying. |
| --lockout | Lock output file while copying. |
| --volumelabel [VOLUME_LABEL] | Send output to a volume on a removable drive with the specified volume label. If '--volumelabel' is specified, the volume name is prepended to the path specified by 'of'. |
| --eject | Dismount and, if possible, eject the volume specified by the '--volumelabel' option. |
| --localwrt | Enables writing output to a local fixed drive. |
| --restore_access_times | Restores file access times on the source. |
| --locale [LANG] | Specifies the output locale. |
| --seek [BYTES] | Skip the specified number of bytes at start of output. |
| --skip [BYTES] | Skip the specified number of bytes at start of input. |
| --count [BYTES] | Stop after acquiring the specified number of bytes. |
| --chunk [BYTES] | Set the maximum size of the output file. If the output file exceeds the specified size, the file is split into multiple fragments of BYTES bytes in size. |
| --comp [ALGORITHM] | Compress output using the specified algorithm. |
| --decomp [ALGORITHM] | Decompress output using the specified algorithm. |
| --allvolumes | Copy all mounted volumes with optional user prompts for each volume. |
| --alldrives | Copy all local drives with optional user prompts for each disk. |
| --random_output_dir | Append a random-named output directory to the specified output path. |

-A, --attributes hashes files with specified attributes:
    D Directories
    R Read-only files
    H Hidden files
    A Files ready for archiving
    C Compressed files
    E Encrypted files
    O Offline files
    P Sparse files
    S System files
    ~ Prefix meaning not
    T Temporary files
--any Specifies how the -A--attribute option is to be interpreted. With '--any' files or streams with any one of the specified attributes will be processed. The default is to hash files with all of the specified attributes.

The following are used to select files based upon file times:

| | |
|---|---|
| --modified [FILETIME] | Selects files based upon the file modification time. |
| --accessed [FILETIME] | Selects files based upon the file access time. |
| --created [FILETIME] | Selects files based upon the file creation time. |

The format of the FILETIME string is specified according to the locale of the current user. For example, 10:00 PM Jun. 6, 2003 is specified as "Jun. 10, 2003 10:00 PM" in the United States and "Oct. 6, 2003 10:00 PM" in most European countries. The file time string may be pre-pended by <, = or > to search for file times that are less than, equal or greater than the specified time string. The FILETIME string may include multiple conditions separated by a semi-colon (;). Multiple conditions are evaluated in pairs. An un-paired condition is evaluated individually.

The following may be used to select directories, files or streams based upon specified regular expressions:

| | |
|---|---|
| --directory filter [EXPRESSION] | selects directories based upon an expression. |
| --file filter [EXPRESSION] | selects files based upon an expression. |
| --stream filter [EXPRESSION] | selects alternate streams based upon an expression |
| --magic filter [EXPRESSION] | selects files or alternate streams based upon the binary contents at the start of the data stream as evaluated by an expression. |

EXPRESSION may be any regular expression. Double quotes (" ") may be used to prevent the command interpreter from splitting a single expression into two or more pieces. With respect to the -magic filter option, EXPRESSION is limited to a regular expression that may be converted to a single byte character set.

The following may be used to select files or streams based upon the entropy of the initial data stream:

| | |
|---|---|
| --entropy [THRESHOLD] | Selects files or streams whose initial data streams have an entropy greater than THRESHOLD. |

The following may be used in conjunction with output in xml format:

| | |
|---|---|
| --case [CASE NUMBER] | Includes the specified case number in xml output. |
| --evidence [EVIDENCE NUMBER] | Includes the specified evidence number in XML output |
| --description [DESCRIPTION] | Includes an optional description in xml output. |

The following option may be used to set the thread priority of the program:

| | |
|---|---|
| --thread_priority [PRIORITY] | Sets the priority of the thread processing. |

The thread priority may be set to any of the following values:
idle, lowest, below normal, highest above normal, time critical

| | |
|---|---|
| --ata_unlock [PASSWORD] | Unlocks an ATA drive using the provided password. |
| --ata_master | Specifies that the password provided with --ata_unlock is a master password. |
| --ata_hpa | Temporarily disables the ATA host protected area if it exists and sets the starting offset to skip the user accessible bytes. |
| --ata_restore_configuration | Resets an ATA device configuration overlay (DCO) and restores the original drive configuration. |

The enterprise level options include:
--cryptvolumes Copy all mounted encrypted volumes with optional user prompts for each volume.
--ssl [CERTIFICATE] Make TCP connections using the TLS 1.0 protocol and the specified certificate. The certificate, which is optional for client connections, must be in PFX (PKCS #12) file format, if it exists.
--encrypt [ALGORITHM] Specifies the encryption algorithm that will be used to encrypt output. The default algorithm is AES-256 on Microsoft Windows XP and later, and 3DES on Windows 2000.
--cert [PATH] Provides the path to an X-509/PKCS #7 encoded file. The certificate will be used to encrypt the encryption key used to encrypt output.
--ignore_invalid_cert Ignore errors that may occur due to use of an unsigned or expired certificate.

In the fifth step of the method of the present invention, the data collection program performs an audit by executing winaudit.exe (or any other system audit utility), which queries the operating system and the computer registry, and stores the resulting information in a file for later review. Data collection options include:

i. Make and model of the computer system ii. Make and model of the computer system's hard drive that was imaged iii. Size and available capacity of that hard drive iv. Operating system install date and time v. User log on statistics vi. Attached devices All of the following switches are optional. If none are supplied, the program runs in Windows® mode.

| Switch | Options | Comment |
|---|---|---|
| /h | | Show a help message and exit. |
| /r | | Report content, default is NO sections, i.e. nothing is done. |
| | g | Include System Overview |
| | s | Include Installed Software |
| | o | Include Operating System |
| | P | Include Peripherals |
| | x | Include Security |
| | u | Include Groups and Users (Window ® NT4 and above) |
| | T | Include Scheduled Tasks |
| | U | Include Uptime Statistics (Window ® NT4 and above) |
| | e | Include Error Logs (Window ® NT4 and above) |
| | N | Include Windows Network |
| | t | Include Network TCP/IP |
| | n | Include Network BIOS |
| | z | Include Devices (Windows ®98 and newer) |
| | D | Include Display Capabilities |
| | I | Include Installed Printers |
| | b | Include BIOS Version |
| | M | Include System Management |
| | p | Include Processor |
| | m | Include Memory |
| | i | Include Physical Disks |
| | d | Include Drives |
| | c | Include Communication Ports |
| | S | Include Startup Programs |
| | A | Include Services (Window ® NT4 and above) |
| | r | Include Running Programs |
| | B | Loaded Modules |
| | L | Include System Files |
| | F | Include Find Files |
| /o | | Output format, if none is specified will default to formatted text (TEXT). |
| | CHM | Save as compiled html. Requires Html Help Workshop installed. The locations of hhc.exe and hha.dll must in the PATH environment variable. |
| | CSV | Save as comma delimited |
| | HTML | Save as a web page without images |
| | HTMLi | Save as a web page with images |
| | ODBC | Export to a Database |
| | PDF | Save in portable document format |
| | TEXT | Save as formatted text |

-continued

| Switch | Options | Comment |
|--------|---------|---------|
|  | TEXTt | Save as tab delimited text |
|  | TEXTu | Save as Unicode text (UTF-16, little endian) |
|  | XML | Save as XML extended markup language |
| /f |  | Output file or data source name. Report will be saved to this file. Default is 'computername.ext.' If /o is specified as ODBC supply a data source name (DSN) else will default to WinAuditDSN. macaddress is a reserved word (case insensitive). If specified, the output will be written to a file named using a Media Access Control (MAC) address. If no MAC address can be resolved, then the computer's name will be used. On systems with multiple network adapters, the address of the first one discovered will be used. |
| /u |  | User name for database login. |
| /p |  | Password for database login or PDF protection. Embedding passwords in a batch file is, of course, questionable but the functionality is available for those who wish to use it. |
| /e |  | Quoted list of file extensions to find on local hard drives. |
| /t |  | Timeout in minutes for audit. The audit will automatically stop if it has been running for more than the specified number of minutes. If unspecified, the default is 20 minutes. If a timeout occurs then some or perhaps all data will be discarded. |
| /l |  | The log file path to record diagnostic and activity messages. The log level is fixed at verbose and the output is tab separated machine readable. If an empty path is specified i.e. '/l=' then the destination will be computername_log.txt in the programs directory. If only a directory is supplied e.g. '/l=\\server\audits' then the destination will be '\\server\audits\computername_log.txt'. To avoid concurrency issues, multiple machines cannot log to the same file. |
| */m |  | The message displayed on the audit window. The user sees this window when the audit is running in command line mode. Try to keep this message brief as it must fit in the available space and still remain legible. The message does not need to be quoted. Avoid forward slashes '/' as your message will not display correctly. If no message is supplied then a default one will be shown. |
| /L |  | (Capital L) Set the language of strings used by the programme. By default the programme will use the language that matches the computer's regional setting or English if no translation is available. You can override this behaviour by specifying which language to use as a two letter ISO Language Code:<br>/L=cs - Czech<br>/L=en - English<br>/L=es - Spanish<br>/L=de - German<br>/L=fr - French<br>/L=hu - Hungarian<br>/L=it - Italian<br>/L=nl - Dutch<br>/L=pt - Portugese<br>/L=ru - Russian<br>/L=sr - Serbian(Latin)<br>/L=tr - Turkish<br>This can help to ensure consistent reporting in a multi-lingual environment. Note, only translated strings are handled; any specific number or date formatting is still done according to the computer's regional setting. |

-continued

| Switch | Options | Comment |
|--------|---------|---------|
|  |  | For CSV output, the programme will emit commas regardless of any regional setting. PDF document creation will use the code page associated with the specified language however, proper character translation is not guaranteed. WinAudit ANSI: Choosing a language which has a character set (code page) outside of the one a computer is using may give rise to undesired results. For example, German and Czech are from the Western and Central European character sets respectively. Character number 163 corresponds to the Japanese Yen sign in the former and a variant of the letter A in the latter. In general, characters used in the English language are common across all character sets so setting /L = en would probably give the most consistent results. WinAudit Unicode: Use this version in preference over the ANSI version if you are in an NT only environment. The Unicode version will automatically perform UTF-8 conversion of characters for HTML and XML output. Text files are saved in Unicode format (UTF-16 little endian) and database connectivity is via wide (2-byte) characters. Diagnostic logging will detect the log file's encoding scheme. You should also be able to set a message (/m) and use file paths in Unicode. |

In the sixth step of the method of the present invention, the data collection program displays a message advising the custodian that (a) the process is completed, and (b) the external hard drive can now be disconnected and returned to the sender. The data collection program then closes.

The custodian then returns the external hard drive to the computer forensic company by an overnight courier service. Once the drive is received by the computer forensic company, the image is verified (and decrypted if necessary). Thus, it can be seen that the method of the present invention prevents the custodian from deselecting certain files, or accidently deleting or spoiling data.

The minimum recommended system for use by the data collection program is a system as follows:
a. Microsoft Windows 9x, NT, XP, Vista, 7
b. 512 MB RAM
c. External USB V2.0 port (V1.1 supported)
d. SVGA graphics controller

The invention claimed is:

1. A method of a first computer system obtaining a complete forensic image of an electronic storage media that is part of a second computer system containing electronic data, by collecting forensic data, the storage media being part of the second computer system which includes a display screen, the method comprising the steps of:
 a. using the first computer system to store a data collection program on a password-encrypted external storage device, the storage device having a USB 1.1 or greater interface, the storage device receiving all of its operating power via the USB interface, the first computer system modifying the data collection program,
  i. to select a desired level of encryption,
  ii. to require specific input of information from a custodian of the electronic data,
  iii. to select switches to capture RAM,
  iv. to select a drive to be imaged, v. to select data capturing switches, to be used during the process of capturing the forensic data, from the group of switches comprising: verification, chunked file sizes, logging options, and verification, and vi. to select audit switches, to be used to perform a system audit after termination of the imaging by the data collection program, from the group of audit switches comprising: operating system version, logged-on user name, hard drive size, and electronic serial numbers;

b. sending the external storage device to the custodian of the electronic data, together with means for the custodian to easily return the external storage device;

c. the custodian connecting the external storage device to the second computer system containing the storage media, once connected, the data collection program displaying a splash screen on the display screen;

d. the data collection program, via the splash screen, using the second computer system to forensically collect the electronic data to create a complete forensic image, on the external storage device, of the storage media containing the electronic data;

e. the data collection program encrypting the external storage device;

f. the data collection program auditing the forensic image; and g. the data collection program preserving an exact copy of the forensic image onto the external storage device without making changes to the forensic image.

2. The method according to claim 1, further including, after the step of connecting the external storage device to a computer system, the splash screen of the data collection program requiring the custodian to enter his name and email address.

3. The method according to claim 1, further including, after the step of asking the custodian to enter his name and email address, the data collection program then requiring the custodian to select which electronic storage media to image.

4. The method according to claim 1, further including, in the step of storing a data collection program on an external storage device, also encrypting the external storage device, wherein the encrypting is done without input from the custodian.

5. The method according to claim 1, further including, in the step of storing a data collection program on an external storage device, setting the switches on the data collection program to designate which storage media inside the computer system, or attached to the computer system, are to be forensically imaged.

6. The method according to claim 1, wherein the step of the data collection program forensically collecting the electronic data further includes preventing the custodian from deselecting certain files, and preventing the custodian from deleting and spoiling data.

7. The method according to claim 1, wherein the step of storing a data collection program on an external storage device includes setting software switches in the data collection program so that the subsequent step of auditing the forensic image includes collecting the following data into a file for later review: (a) the make and model of the computer system; (b) the make and model of the computer system's storage media that was imaged; (c) the size and available capacity of that storage media; (d) the operating system install date and time; (e) the user log on statistics; and (f) the attached devices.

8. A non-transitory, computer-readable, encrypted, portable storage medium with an executable program stored thereon, the portable storage medium receiving all of its operating power via a USB interface, wherein the program instructs a microprocessor to perform the following steps:

a. creating a sector-by-sector forensic image of a storage media, that is part of a computer system, by calling a data collection program;

b. storing the forensic image on the portable storage medium;

c. verifying the integrity of the forensic image;

d. performing an audit of the forensic image, and storing the resulting information in a file on the portable storage medium;

e. displaying a message advising that (i) the process is completed, and (ii) the portable storage medium can now be disconnected from the storage media; and f. preserving an exact copy of the forensic image without making changes to the forensic image.

9. The portable storage medium according to claim 8, wherein the step of creating a sector-by-sector forensic image further includes preventing deselecting certain files, and preventing deleting and spoiling data.

10. The portable storage medium according to claim 8, wherein the step of storing the forensic image further includes storing the forensic image in 2 GB files on the portable storage medium.

11. The portable storage medium according to claim 8, wherein the step of verifying the integrity of the forensic image further includes verifying the integrity of the forensic image using a hash algorithm.

12. The portable storage medium according to claim 8, wherein the step of verifying the integrity of the forensic image further includes verifying the integrity of the forensic image using an MD5 hash algorithm.

13. The portable storage medium according to claim 8, wherein the step of performing an audit includes collecting the following data into a file: (a) the make and model of the computer system; (b) the make and model of the computer system's storage media that was imaged; (c) the size and available capacity of that storage media; (d) the operating system install date and time; (e) the user log on statistics; and (f) the attached devices.

14. A data collection system comprising a first computer system, a password-encrypted external storage device, and a second computer system comprising a display screen and an electronic storage media containing electronic data, wherein:

a. the first computer system is programmed to store a data collection program on the password-encrypted external storage device, the storage device having a USB 1.1 or greater interface, the storage device receiving all of its operating power via the USB interface, and wherein the first computer system is programmed to modify the data collection program:

i. to select a desired level of encryption, ii. to require specific input of information from a custodian of the electronic data, iii. to select switches to capture RAM, iv. to select a drive to be imaged, v. to select data capturing switches, to be used during the process of capturing the forensic data, from the group of switches comprising: verification, chunked file sizes, logging options, and verification, and vi. to select audit switches, to be used to perform a system audit after termination of the imaging by the data collection program, from the group of audit switches comprising: operating system version, logged-on user name, hard drive size, and electronic serial numbers;

b. when the external storage device is connected to the second computer system, the data collection program:
  i. displays a splash screen on the display screen;
  ii. via the splash screen, uses the second computer system to forensically collect the electronic data to create a complete forensic image, on the external storage device, of the storage media containing the electronic data;
  iii. encrypts the external storage device;
  iv. audits the forensic image; and
  v. preserves an exact copy of the forensic image onto the external storage device without making changes to the forensic image.

* * * * *